(12) United States Patent
Kim et al.

(10) Patent No.: US 8,169,975 B2
(45) Date of Patent: May 1, 2012

(54) METHOD FOR RESERVING PROPAGATION TIME BY ESTIMATING CHANNEL ENVIRONMENT IN WIRELESS PERSONAL AREA NETWORK

(75) Inventors: Junwhan Kim, Seoul (KR); Jae-Doo Huh, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 17 days.

(21) Appl. No.: 12/312,914

(22) PCT Filed: Nov. 28, 2007

(86) PCT No.: PCT/KR2007/006067
§ 371 (c)(1),
(2), (4) Date: Jun. 1, 2009

(87) PCT Pub. No.: WO2008/066327
PCT Pub. Date: Jun. 5, 2008

(65) Prior Publication Data
US 2010/0067388 A1    Mar. 18, 2010

(30) Foreign Application Priority Data
Dec. 1, 2006    (KR) .................. 10-2006-0120835

(51) Int. Cl.
*H04W 4/00*    (2009.01)
*G01R 31/08*    (2006.01)
*H04B 1/00*    (2006.01)
(52) U.S. Cl. ........... 370/332; 370/234; 370/252; 455/69
(58) Field of Classification Search .................. 370/232, 370/234, 252, 332; 455/69
See application file for complete search history.

(56) References Cited

U.S. PATENT DOCUMENTS
2003/0013482 A1*    1/2003    Brankovic .................. 455/553
2004/0017790 A1*    1/2004    del Prado et al. ............ 370/333
(Continued)

FOREIGN PATENT DOCUMENTS
KR    10-2005-0027131    3/2005
(Continued)

OTHER PUBLICATIONS

Junwhan Kim et al., "Rate Adaptation Scheme for Slot Reservation in WiMedia MAC", Consumer Electronics, 2007. ICCE 2007. Digest of Technical Paper, pp. 1-2, Jan. 10-14, 2007.

*Primary Examiner* — Ricky Ngo
*Assistant Examiner* — Paul H Masur
(74) *Attorney, Agent, or Firm* — Staas & Halsey LLP

(57) ABSTRACT

Provided is a method for reserving a propagation time by estimating a channel environment in a wireless personal area network. The method includes the steps of: a) measuring a propagation range to the reception station upon starting data transaction with the reception station; b) measuring an average Strength Signal (ARSS) for determining a final transfer speed upon checking a transfer speed corresponding to the propagation range to the measured reception station based on a pre-defined table; c) determining a final transfer speed based on the transfer speed corresponding to the propagation range to the reception station according to a result that the measured ARSS is compared with Upper Bound RSS (URSS) and Lower Bound RSS (LRSS); and d) reserving a next propagation time according to the determined final transfer speed.

7 Claims, 4 Drawing Sheets

U.S. PATENT DOCUMENTS

| | | | |
|---|---|---|---|
| 2006/0019610 A1* | 1/2006 | Ue et al. | 455/69 |
| 2006/0039346 A1 | 2/2006 | Shapiro | |
| 2006/0105779 A1* | 5/2006 | Uta et al. | 455/456.1 |
| 2006/0105785 A1* | 5/2006 | Gfeller et al. | 455/456.5 |
| 2006/0227740 A1 | 10/2006 | McLaughlin et al. | |
| 2007/0139269 A1* | 6/2007 | Chen et al. | 342/450 |
| 2007/0201382 A1* | 8/2007 | Ekl et al. | 370/254 |
| 2009/0296598 A1* | 12/2009 | Harvey et al. | 370/252 |
| 2010/0135156 A1* | 6/2010 | Sarkar | 370/230 |

FOREIGN PATENT DOCUMENTS

| | | |
|---|---|---|
| KR | 10-0890913 | 3/2009 |

\* cited by examiner

METHOD FOR RESERVING PROPAGATION TIME BY ESTIMATING CHANNEL ENVIRONMENT IN WIRELESS PERSONAL AREA NETWORK

CROSS REFERENCE TO RELATED APPLICATIONS

This application claims the benefit of International Application No. PCT/KR2007/006067, filed Nov. 28, 2007, and claims the benefit of Korean Application No. 10-2006-0120835, filed Dec. 1, 2006, the disclosures of all of which are incorporated herein by reference.

TECHNICAL FIELD

The present invention relates to a method for reserving a propagation time by estimating a channel environment in a wireless personal area network; and, more particularly, to a method for reserving a propagation time by estimating a channel environment in a wireless personal area network based on a propagation range from a receiver measured by a transmitter and determining a data transfer speed to the receiver according to an estimation result.

BACKGROUND ART

Recently, wireless services are introduced to advance a ubiquitous society where all materials and objects are sophisticated and exchange information by being connected in an electronic space.

The ubiquitous can be successful only through a wireless network. Accordingly, current wireless communication base has been diversely developed. A Wireless Personal Area Network (WPAN), which is one of wireless communication bases, includes a bluetooth, ultra wideband (UWB), zigbee, and WiMedia.

In particular, the WiMedia as a compound word of wireless and a media is a wireless technology for removing a connection cable in a home networking. The WiMedia enables super-high speed data transfer between electronic home appliances such as a computer, Personal Digital Assistant (PDA), an MP3 player, a digital television (TV), a high definition TV (HDTV), a Digital Versatile Disc (DVD) player, a digital camcorder, a digital set-top box, and a game console.

WiMedia Medium Access Control (MAC) includes a Distributed Reservation Protocol (DRP) and Priority Contention Access (PCA). The DRP is a protocol similar to Time Division Multiplexing Access (TDMA) and denotes a method for reserving a data propagation time in advance and transferring data at the reserved time. The PCA is a method for transferring data based on different backoffs according to 4 priorities.

A conventional WiMedia MAC operation will be described hereinafter. FIG. 1 shows the conventional WiMedia MAC operation.

Referring to FIG. 1, a superframe 101 includes 256 Medium Access Slots (MASs) 121. The superframe 101 is divided into a beacon period 110 and a data transfer period 120.

In the data transfer period 120, the data are transferred according to a DRP 122 and a PCA 123. The beacon period 110 includes beacon slots and only beacons in the beacon slot are transferred. The beacon synchronizes a network.

The DRP 122 includes a method for reserving a transfer period in the beacon period 110 and transferring data in the reserved transfer period, which is called an Implicit Negotiation (IN) method, and a method for reserving the MAS 121 through DRP negotiation and transferring data in the reserved transfer period, which is called an Explicit Negotiation (EN) method.

The IN method reserves own data transfer period 120 by loading a DRP information element (IE) in a beacon in the beacon period 110. The EN method reserves own data transfer period 120 of the DRPs 122 by transferring a reserve request frame to the PCA 123 before the DRP 122. The IN method and the EN method initialize the DRP information element in a transfer station and include the number of the MASs 121 in the superframe 100.

When two stations reserve the same MAS 121, a collision occurs in the DRP reservation and a negotiation reservation having a high priority occupies the MAS 121. The reservation includes set of the MASs 121.

The PCA 123 is the same as an Enhanced Distributed Contention Access (EDCA) method of IEEE 302.11e. That is, the PCA 123 is a method for transferring data through competition with different backoffs and contention windows in 4 queues. The DRP 122 and the PCA 123 is a transferring method for preventing collision of a transfer station in a channel environment.

As described above, the WiMedia reserves a propagation time determined when the data to be transferred from the transmitter are generated in order to enable ultra-high speed data transfer among a plurality of communication objects. That is, the WiMedia reserves a specific time for transferring data in order to prevent collision in transferring data.

When the transmitter transfers data, the conventional WiMedia reserves a propagation time based on the DRP of the WiMedia MAC. To be specific, when the conventional WiMedia does not receive an acknowledge (ACK) frame in transferring the data, data are retransferred. When the data are retransferred, an entire data propagation time of the conventional WiMedia is shortage since the DRP period is already reserved. Therefore, the conventional WiMedia prepares for delay caused by retransfer by transferring the rest data based on a next DRP reservation period or setting up an additional reservation period in advance.

Since the propagation time is limited by an environment, the conventional WiMedia regularly reserves an additional propagation time of 30%. When the channel environment is deteriorated, the additional propagation time of 30% is proper to the reservation time. However, when the channel environment is largely shortage, the additional propagation time of 30% may be not enough. Accordingly, since the rest data which are not transferred within the reservation time should wait until a next reservation time in the conventional WiMedia, the entire transfer delay occurs. On the other hand, when the channel environment is good, the additional propagation time of 30% is wasted in the conventional WiMedia.

Therefore, it is required that the conventional WiMedia provides reliability in data transfer by estimating the channel environment in a wireless personal area network and reserving the propagation time of the DRP period.

DISCLOSURE

Technical Problem

An embodiment of the present invention is directed to providing a method for reserving a propagation time by estimating channel environment in a wireless personal area network based on a propagation range from a receiver measured by a transmitter and determining a data transfer speed to the receiver according to an estimation result.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for reserving a propagation time by estimating a channel environment in a wireless personal area network formed with the reception station, including the steps of: a) measuring a propagation range to the reception station upon starting data transaction with the reception station; b) measuring an average Strength Signal (ARSS) for determining a final transfer speed upon checking a transfer speed corresponding to the propagation range to the measured reception station based on a pre-defined table; c) determining a final transfer speed based on the transfer speed corresponding to the propagation range to the reception station according to a result that the measured ARSS is compared with Upper Bound RSS (URSS) and Lower Bound RSS (LRSS); and d) reserving a next propagation time according to the determined final transfer speed.

Advantageous Effects

As described above, the present invention can reserve a propagation time by estimating a quality of a channel environment based on a range from a receiver measured by the transmitter and determining a data propagation time to be transferred to the receiver according to a result.

The present invention can secure stable multimedia transfer by raising reliability in the data transfer by estimating an exact channel environment.

Also, the present invention can perform DRP reservation by estimating a range or a presence of an obstacle.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

The present invention provides a method for reserving a propagation time by estimating a channel environment. Therefore, the present invention estimates a channel environment and determines a transfer speed. The transfer speed is determined based on a propagation range and Received Strength Signal Indication (RSSI) measured by a transmitter. Finally, the determined transfer speed is used to calculate a transfer reservation time of Distributed Reservation Protocol (DRP).

Figure 1:
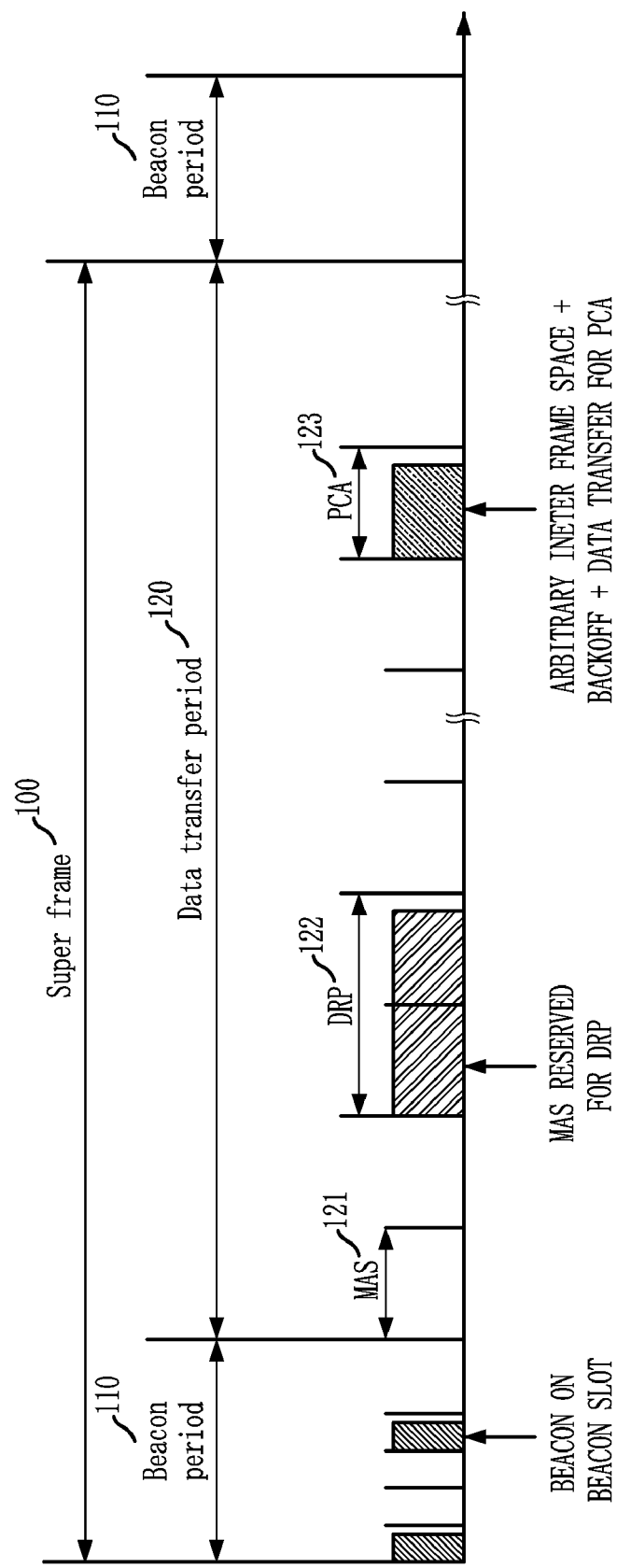
FIG. 1 shows the conventional WiMedia MAC operation.
Figure 2:
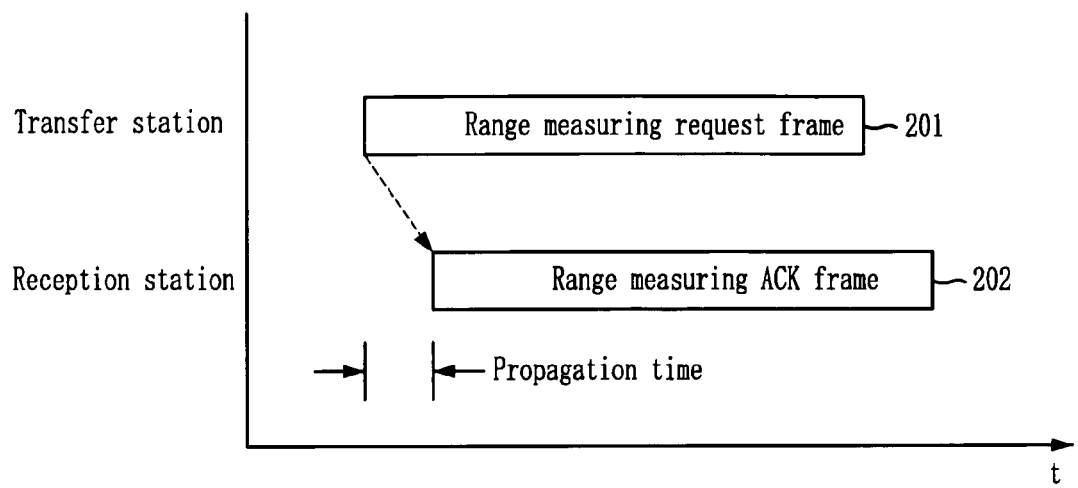
FIG. 2 shows a propagation range measuring method where the present invention is applied.

FIG. 2 shows a propagation range measuring method where the present invention is applied.

Referring to FIG. 2, the propagation range measuring method measures a propagation range according to a general Range Mean Operation (RMO) method.

To be specific, in the propagation range measuring method, time information, i.e., a time stamp, is included before a transfer station transfers a range measuring request frame 201 to a reception station. When the range measuring request frame 201 is transferred, the reception station can calculate a propagation time, that is, a first propagation time, by checking a time when the transfer station transfers the range measuring request frame 201 to the reception station. Accordingly, the reception station can calculate a propagation range from the transfer station based on the calculated propagation time and a light speed.

However, when the propagation range is measured only in the reception station, the propagation range measuring method has a large error. Accordingly, the propagation range is measured as follows. That is, the reception station transfers a range measuring ACK frame 202 loading the time information in the range measuring request frame 201 to a transfer station.

The transfer station calculates a second propagation time by checking a propagation time that the reception station transfers the range measuring ACK frame 202 and a time that the range measuring ACK frame 202 is transferred to the transfer station based on the range measuring ACK frame 202 transferred from the reception station. The transfer station can calculate the first propagation time based on the range measuring ACK frame 202.

The transfer station can calculate a propagation range between two stations by multiplying a light speed by an average value of the first and second propagation time. As described above, the transfer station measures the propagation range to the reception station.

Figure 3:
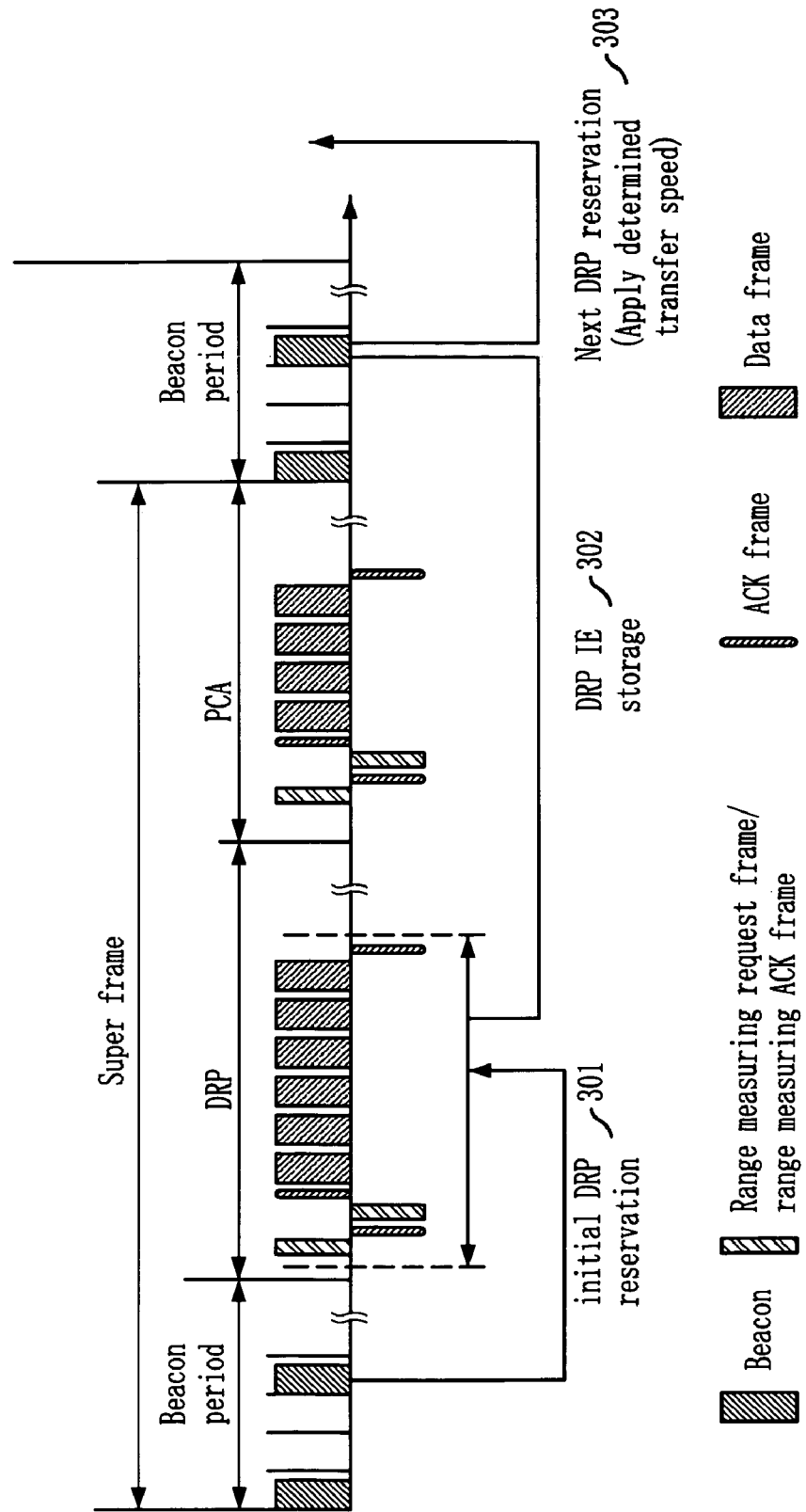
FIG. 3 shows a WiMedia Medium Access Control (MAC) operation in accordance with an embodiment of the present invention.

FIG. 3 shows a WiMedia Medium Access Control (MAC) operation in accordance with an embodiment of the present invention.

Referring to FIG. 3, when the data are transferred based on the DRP in the transfer station, the WiMedia MAC operation reserves a transfer period. The IN method is adopted for the DRP reservation in the WiMedia MAC operation.

As described above, when the transfer station reserves the transfer period, the transfer period considering retransfer should become large according to increase of the error rate cased by a range or an obstacle. The WiMedia MAC operation increases reliability of transfer and secures a stable multimedia transfer by estimating a channel environment in order to reserve an exact transfer period.

To be specific, the transfer station estimates a channel environment and determines a transfer speed according to an estimated result. The transfer station calculates a DRP transfer reservation time based on the determined transfer speed.

The WiMedia MAC operation of the transfer station will be described in detail hereinafter.

When the transfer station transfers data initially, the transfer station performs an initial DRP reservation 301 on the basis of a Lower Bound RSS (LRSS). Subsequently, when the transfer station estimates a channel environment and determines a transfer speed according to the estimated result, Table 1 pre-defined according to a physical layer (PHY) of the transfer station is used.

TABLE 1

| Propagation Range (m) | Data Rate (Mbps) | Upper bound RSSI (URSS) |
|---|---|---|
| — | 53.3 | 3.5 |
| — | 80 | 3.5 |
| 9~ | 106.7 | 3.5 |
| 7~9 | 160 | 4 |
| 5~7 | 200 | 4 |
| 3~5 | 320 | 4.5 |
| 2~3 | 400 | 5 |
| ~2 | 480 | 5 |

Table 1 shows a measurement result of an optimal transfer speed, i.e., a data rate, with respect to the propagation range in Line of Sight (LOS) meaning a status that there is no obstacle between the transfer station and the reception station.

An Upper Bound RSS (URSS) is an average value of a maximum signal strength that the transfer station can receive from the reception station in a propagation range. Also, a LRSS is an average value of a minimum signal strength that the transfer station can receive from the reception station in a propagation range.

As shown in Table 1, the URSS means a signal strength that the transfer station measures from the reception station in the LOS. In addition, the URSS may be defined at a lower value than an actually measured signal strength.

Before starting transfer, the transfer station measures a propagation range to the reception station mentioned in FIG. 2. The transfer station checks a transfer speed corresponding to the propagation range based on Table 1. The transfer speed is influenced only by the propagation range and the obstacle between the transfer station and the reception station is not considered.

Accordingly, the transfer station checks the presence of obstacles by measuring Average RSS (ARSS) and finally determines a transfer speed applying the ARSS. That is, the transfer station determines an optimal transfer speed ranging from the transfer speed suggested in Table 1 to a lowest transfer speed.

To be specific, the transfer station determines a final transfer speed based on the URSS and the LRSS. When the transfer speed is checked according to the range based on Table 1, the transfer station determines the final transfer speed by measuring the ARSS.

First, when the measured ARSS is the same as or larger than the URSS, i.e., ARSS≧URSS, the transfer station determines a transfer speed corresponding to the propagation range suggested in Table 1.

Second, when the measured ARSS is between the URSS and LRSS, i.e., LRSS<ARSS<URSS, the transfer station determines a transfer speed lower than the transfer speed corresponding to the propagation range suggested in Table 1. When the ARSS is close to the URSS, the transfer station selects a one-step lower transfer speed. When the ARSS is close to the LRSS, the transfer station may select a two-step lower transfer speed, or a transfer speed which is one-step higher than the lowest transfer speed.

Third, when the measured ARSS is smaller than or the same as the LRSS, i.e., ARSS≧LRSS, the transfer station determines 53.3 Mbps, which is the lowest transfer speed in Table 1. Subsequently, the transfer station stores the determined transfer speed in a DRP IE 302 and applies the determined transfer speed to a next DRP reservation 303.

Figure 4:
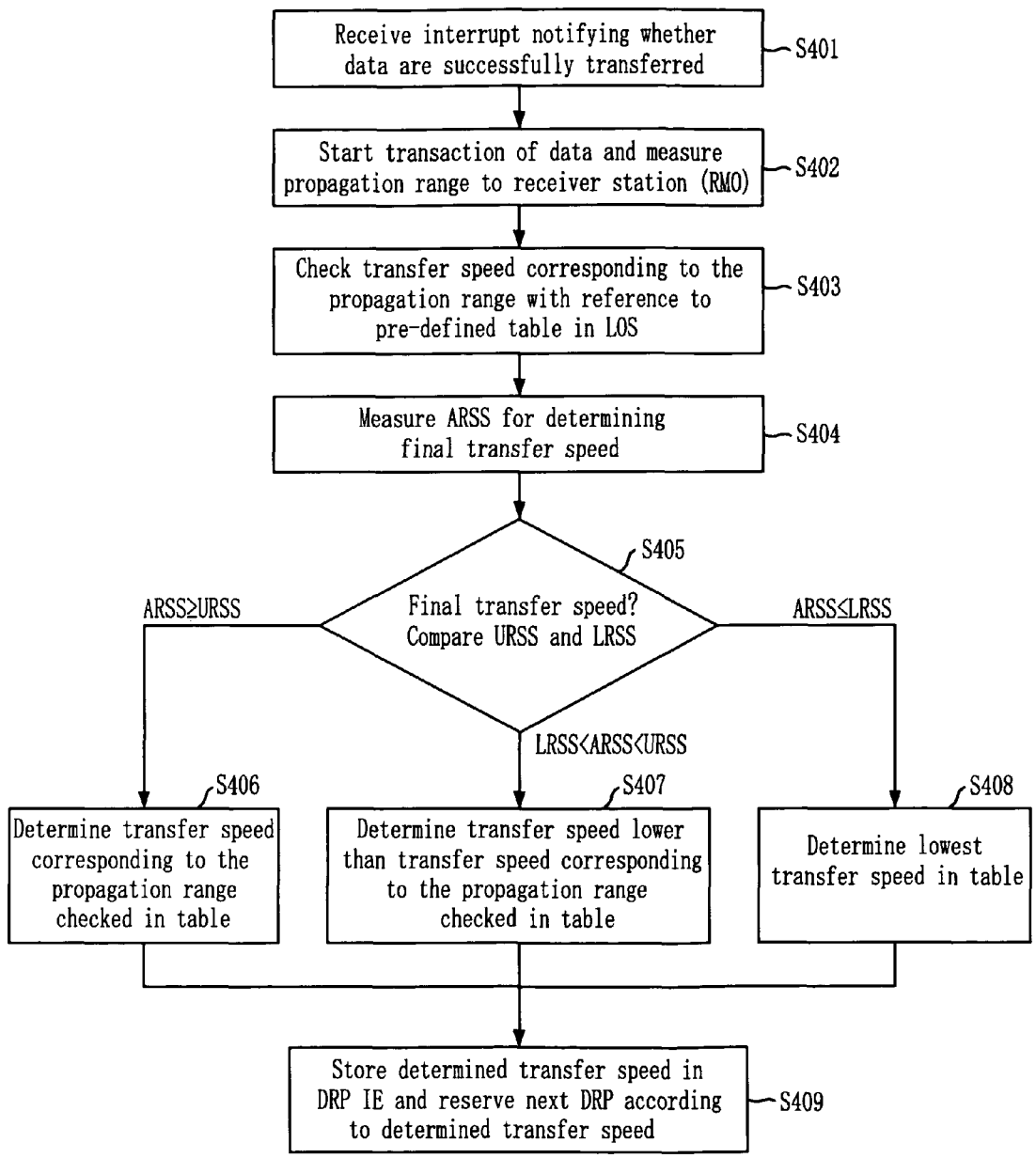
FIG. 4 is a flowchart describing a method for reserving a propagation time by estimating a channel environment in a wireless personal area network in accordance with an embodiment of the present invention.

FIG. 4 is a flowchart describing a method for reserving a propagation time by estimating a channel environment in the wireless personal area network in accordance with an embodiment of the present invention.

Referring to FIG. 4, when the transfer station transfers data initially, the transfer station performs initial DRP transfer reservation based on the LRSS. Subsequently, the transfer station receives an interrupt notifying whether the data are successfully transferred at step S401.

When the transfer station starts transaction of data, the transfer station measures a propagation range to the reception station at step S402. The transfer station measures the propagation range to the reception station according to the general RMO method.

The transfer station checks the transfer speed corresponding to the propagation range with reference to the pre-defined table at step S403. The transfer speed corresponding to the propagation range is a table measured and pre-defined in the LOS meaning a status that there is no obstacle.

The transfer station measures the ARSS for determining a final transfer speed at step S404. The transfer station compares the URSS and the LRSS with the ARSS measured at the step S404 in order to determine a final transfer speed at step S405. That is, when the ARSS is larger than or the same as the URSS, the transfer station determines the transfer speed corresponding to the propagation range checked in the table as the final transfer speed at step S406.

When the ARSS is between the URSS and the LRSS, the transfer station determines the transfer speed lower than the transfer speed corresponding to the propagation range checked in the table as the final transfer speed at step S407.

When the ARSS is smaller than or the same as the LRSS, the transfer station determines the lowest transfer speed in the table as the final transfer speed at step S408. The transfer station stores the determined transfer speed in the DRP IE, just as the steps S406 to S408, and reserves next DRP according to the determined transfer speed at step S409.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

What is claimed is:

1. A method for reserving a propagation time by estimating a channel environment in a wireless personal area network formed with a reception station, comprising:

measuring a propagation range to the reception station upon starting data transaction with the reception station;

measuring an average Strength Signal (ARSS) for determining a final transfer speed upon checking a transfer speed corresponding to the propagation range to the measured reception station based on a pre-defined table;

determining a final transfer speed based on the transfer speed corresponding to the propagation range to the reception station according to a result that the measured ARSS is compared with Upper Bound RSS (URSS) and Lower Bound RSS (LRSS); and reserving a next propagation time according to the determined final transfer speed.

2. The method of claim 1, wherein the propagation range to the reception station is measured according to a Range Mean Operation (RMO) method.

3. The method of claim 1, wherein in the measuring the average strength signal, the table is defined by measuring an optimal transfer speed with respect to the propagation range in a Line of Sight (LOS) meaning a status that there is no obstacle between a transfer station and the reception station.

4. The method of claim 1, wherein in the determining the final transfer speed, when the ARSS is larger than or the same as the URSS, the transfer speed checked in the table is determined as the final transfer speed.

5. The method of claim 1, wherein in the determining the final transfer speed, when the ARSS is between the URSS and the LRSS, a transfer speed lower than the transfer speed checked in the table is determined as a final transfer speed.

6. The method of claim 5, wherein when the ARSS is close to the URSS, a one-step low transfer speed is determined as a final transfer speed, and when the ARSS is close to the LRSS, two-step low transfer speed or a transfer speed which is one-step higher than the lowest transfer speed is determined as a final transfer speed.

7. The method of claim 1, wherein in the determining the final transfer speed, when the ARSS is smaller than or the same as the LRSS, the lowest transfer speed in the table is determined as a final transfer speed.

* * * * *